United States Patent [19]

Chen et al.

[11] 4,035,767

[45] July 12, 1977

[54] ERROR CORRECTION CODE AND APPARATUS FOR THE CORRECTION OF DIFFERENTIALLY ENCODED QUADRATURE PHASE SHIFT KEYED DATA (DQPSK)

[75] Inventors: Chin Long Chen, Wappingers Falls; Robert A. Rutledge, Poughkeepsie, both of N.Y.

[73] Assignee: IBM Corporation, Armonk, N.Y.

[21] Appl. No.: 662,493

[22] Filed: Mar. 1, 1976

[51] Int. Cl.² .......................................... G06F 11/12
[52] U.S. Cl. .......................... 340/146.1 AQ; 325/41
[58] Field of Search ....... 340/146.1 AQ, 146.1 AV; 325/41

[56] References Cited

U.S. PATENT DOCUMENTS

| 3,891,959 | 6/1975 | Tsuji et al. | 340/146.1 AQ |
| 3,988,677 | 10/1976 | Fletcher et al. | 325/41 |

OTHER PUBLICATIONS

Forney, Jr. and Bower, A High–Speed Sequential Decoder: Prototype Design and Test, IEEE Transactions on Communication Technology, vol. Com-19, No. 5, Oct. 1971, pp. 821-835.

Chen and Rutledge, Error Correcting Codes for Satellite Communication Channels, IBM Journal of Research and Development, Mar. 1976, pp. 168-175.

*Primary Examiner*—Charles E. Atkinson
*Attorney, Agent, or Firm*—James E. Murray

[57] ABSTRACT

This specification describes a convolutional code and apparatus for the correction of errors in differentially encoded quadrature phase shift keyed data (DQPSK). In each sequence of forty bits 24 are information bits and the remainder are parity bits. Two parity bits are generated for each three information bit set in the sequence in accordance with the following equations:

$$P_8{}^a = i_8{}^a + i_8{}^b + i_6{}^a + i_1{}^b + i_5{}^c + i_2{}^c$$

$$P_8{}^b = i_8{}^a + i_6{}^a + i_3{}^a + i_5{}^b + i_4{}^c + i_4{}^c$$

where $i_8{}^a$, $i_8{}^b$ and $i_8{}^c$ are the three information bits in the set associated with the parity bits $P_8{}^a$ and $P_8{}^b$ while the other information bits are from the seven sets of the sequence preceding the set associated with the parity bits.

3 Claims, 4 Drawing Figures

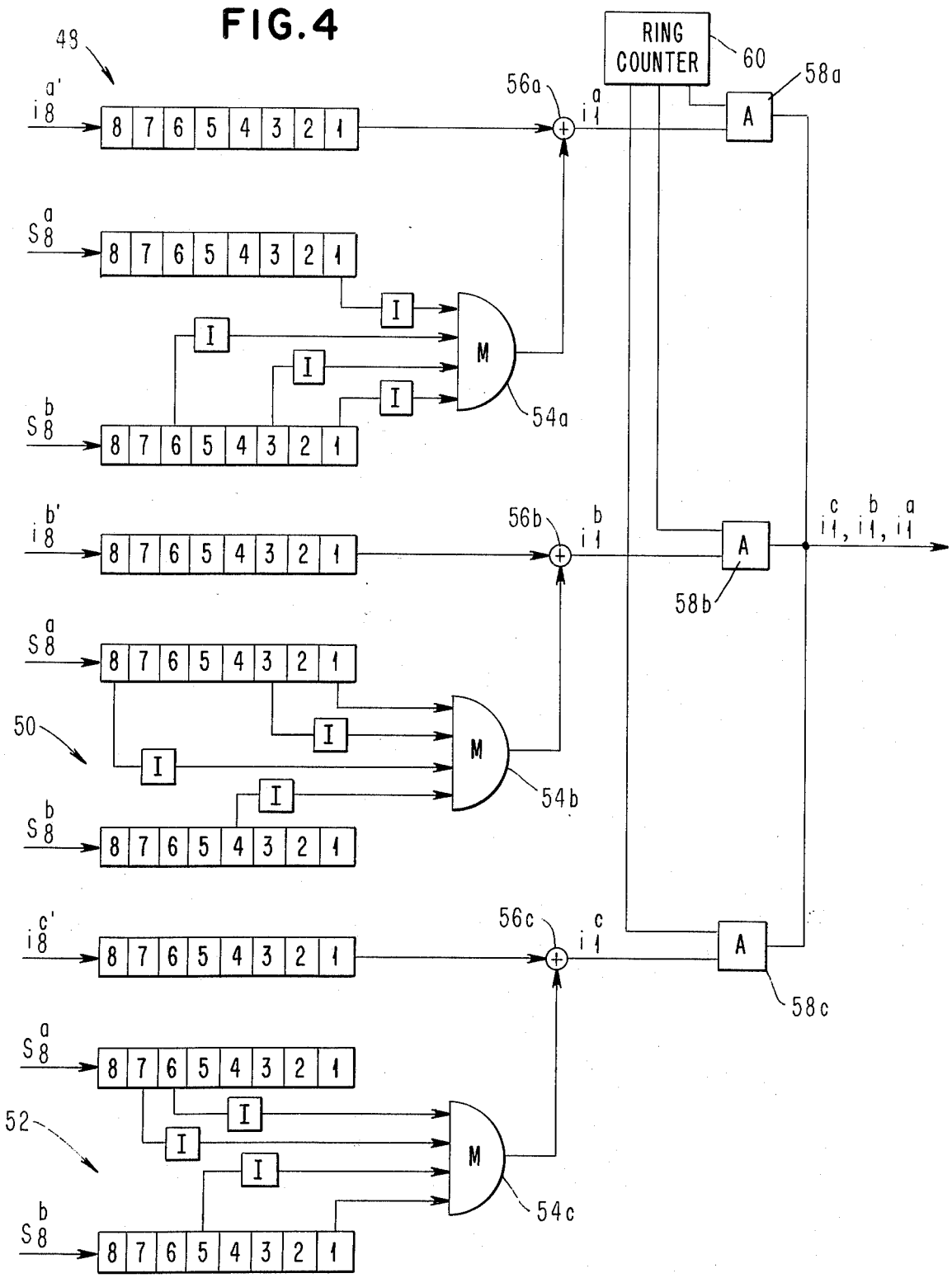

ERROR CORRECTION CODE AND APPARATUS FOR THE CORRECTION OF DIFFERENTIALLY ENCODED QUADRATURE PHASE SHIFT KEYED DATA (DQPSK)

BACKGROUND

The present invention relates to the correction of errors occuring in the transmission of data and more particularly to the correction of errors occurring in the transmission of differentially encoded quadrature phase shift keyed data (DQPSK)

Differentially encoded quadrature shift keying (DQPSK) is a highly efficient modulation technique for satellite communication channels. In a typical DQPSK system each sequential two binary bits of information in a string of binary bits $i_1, i_2 \ldots i_n$ causes a shift $\theta$ in the phase $\psi$ of the carrier signal by the mapping of the combination $[(0,0), (0,1), (1,1), (1,0)]$ of the two bits $i_n, i_{n+1}$ into shifts, $\theta$, of $[0°, 90°, 180°, 270°]$ respectively in the phase $\psi$ of the carrier signal. To put it another way, with DQPSK, information $\theta$ on each two sequential bits $i_n, i_{n+1}$ is encoded as the difference between successive phases, $\psi_{i+1} - \psi_i$.

The advantages of phase shift keying (PSK) is that it is more efficient than frequency shift keying and the advantages of differential phase shift keying (DQPSK) is that it eliminates the need to transmit a reference phase to prevent ambiguity in decoding of the transmitted data. However, one disadvantage of DQPSK is that if a single bit error or an error of 90° in the phase occurs during the transmission of $\psi_i$, the output of the differential decoder will contain two single-bit errors: one in the estimate of $\psi_i - \psi_{i-1}$ and one in the estimate of $\psi_{i+1} - \psi_i$. Thus, the bit error rate is doubled and bit errors are correlated. The correlation of errors is the more serious problem because it severely degrades the efficiency of a random-error correcting code. If, for example, a single-error correcting convolutional code is used for forward error correction, there is no guarantee that it will correct any double-bit errors.

One solution to the problem is to perform error correction before differential decoding of the data. In this scheme, the error correction code (ECC) decoder need not contend with double-bit errors, but is faced with the same phase ambiguity that the differential encoding is used to resolve. Techniques to resolve this ambiguity include an acquisition search at start-up and whenever the modem undergoes a 90° phase slippage; much of the benefit of differential encoding is lost.

Another approach is to transmit adjacent bit pairs on different channels and then interleave the outputs so that single-bit errors are not automatically mapped into double-bit errors. The difficulty with this approach is that it increases the amount of hardware necessary to transmit and correct the data and increases the error rate in the transmitted data.

The other alternative approaches would be to use a code that corrected errors occuring in 4 bit bursts or to use a two bit error correction code to correct for single-bit phase errors. Both of these techniques are very inefficient.

THE INVENTION

Therefore in accordance with the present invention a convolutional code is provided that corrects for all single-bit errors and most double-bit errors occurring in DQPSK.

An $(mn_0, mk_0)$ convolutional code has the truncated parity check matrix $$, H = (D, TD, T^2D, \ldots, T^{m-1}D)$$

where D is an $(n_0-K_0)m \times n_0$ binary matrix and T is the shift matrix defined by $$T_{ij} = \begin{cases} 1 & \text{if } i - j = n_o - k_o, \\ 0 & \text{otherwise.} \end{cases}$$

For a code in systematic form, columns $i_1, i_2, \ldots, i_{k0}$ of D correspond to information bits, and the remaining $n_0-k_0$ columns correspond to parity bits. Let $M(i_j)$ be the submatrix of H obtained by deleting all rows in which the $i_j$th bit is zero. This code is a majority decodable, double error-correcting code if, for $j = 1, 2, \ldots, k_0$, 1. The $i_j$th column of $M(i_j)$ has weight four.
2. Every other column of $M(i_j)$ has weight zero or one.

In other words, the parity check equations corresponding to $M(_j)$ are orthogonalized on the $i_j$th bit. Any such code will correct all single and double-bit errors, and therefore will correct any single DQPSK channel errors (which are two-bit errors).

The code described above cannot in general correct double DQPSK channel errors. A double channel error is either a single 180° phase shift or two distinct 90° phase shifts. This code will correct 180° phase shifts if, for $j = 1, 2, \ldots, k_0$ and $i = 1, 2, \ldots, Mn_0 - 3$, 3. The Exclusive OR of columns $i, i+1, i+2, i+3$ of $M(i_j)$ has weight zero or one if $i_j < i$ or $i_j > i+3$
4. The Exclusive OR of columns $i, i+1, i+2, i+3$ of $M(i_j)$ has weight three or four if $_j - i = 0, 1, 2,$ or 3.

The code will correct two 90° phase shifts if, for $j = 1, 2, \ldots, k_0$ and $i = 1, 2, \ldots, Mn_0-1$, 5. The Exclusive OR of columns $i$ and $i+k$ of $M(_j)$ has weight zero or one if $i \neq i_j$ and $i+k \neq i_j$, for $k=1, 2, 3$.
6. Column $i$ of $M(i_j)$ has weight zero for $|i-i_j| \leq 4$.

In the preferred embodiment a 40% redundancy code or a (40, 24) code is used with $n_0 = 5$, $k_0 = 3$ and $m = 8$. In each sequence of 40 transmitted bits 24 are information bits and the remainder are parity bits. Two parity bits are used to correct for each three information bit set in the sequence. The two parity bits are generated in accordance with the following equations:

$$P_8{}^a = i_8{}^a + i_8{}^b + i_6{}^b + i_1{}^b + i_5{}^c + i_2{}^c$$
$$p_8{}^b = i_8{}^a + i_6{}^a + i_3{}^a + i_5{}^b + i_4{}^c + i_4{}^c \qquad (1)$$

where $i_8{}^a$, $i_8{}^b$ and $i_8{}^c$ are the information bits in the set corrected by the parity bits $P_8{}^a$ and $P_8{}^b$ while the other information bits are from the seven sets in the sequence preceding the set $i_8{}^a$, $i_8{}^b$ and $i_8{}^c$.

If $P'_8{}^a, i'_8{}^a, i'_8{}^b, P'_8{}^b$, and $i'_8{}^c$ is a block of received bits at time $k$. The syndrome bits are calculated as follows:

$$S_8{}^a = P'_8{}^a + i'_8{}^a + i'_8{}^b + i'_6{}^b + i'_1{}^b + i'_5{}^c + i'_2{}^c,$$
$$S_8{}^b = P'_8{}^b + i'_8{}^a + i'_6{}^a + i'_3{}^a + i'_5{}^b + i'_4{}^c + i'_4{}^c. \qquad (2)$$

Let $e_k{}^a, e_k{}^b, e_k{}^c$ be the error bits corresponding to information bits $a, b, c$, respectively, at time $k$.

Then, $$i'^a_k = i^a_k + e^a_k,$$
$$i'^b_k = i^b_k + e^b_k,$$
$$i'^c_k = i^c_k + e^c_k.$$

The value of error bit $e_1^a$ is estimated as $$e_1^a = \begin{cases} 1 \text{ if 3 or 4 of } [S_1^a, S_1^b, S_3^b, S_6^b] \text{ are } 1; \\ 0 \text{ if 2, 3, or 4 of } [S_1^a, S_1^b, S_3^b, S_6^b] \text{ are } 0. \end{cases} \quad (4)$$

If $e_1^a$ is estimated to be 1, then $i'^a_1$ is EXCLUSIVE ORed with $e_1^a$ to yield $i_1^a$. In this case, the syndrome bits $S_1^a$, $S_1^b$, $S_3^b$, and $S_6^b$ are complemented before the next bit is decoded. the complementation removes the effect of $e_1^a$ from the syndrome bits. Similarly, the estimates of $e_1^b$ and $e_1^c$ are determined by the following rules:

$$e_1^b = \begin{cases} 1 \text{ if 3 or 4 of } [S_1^a, S_2^a, S_6^a, S_2^b] \text{ are } 1, \\ 0 \text{ otherwise} \end{cases} \quad (5)$$

$$e_1^c = \begin{cases} 1 \text{ if 3 or 4 of } [S_2^a, S_1^a, S_1^b, S_3^b] \text{ are } 1, \\ 0 \text{ otherwise} \end{cases} \quad (6)$$

This preferred code satisfies conditions 1, 2, 3 and 4. It is not possible to satisfy conditions 5 and 6 for all cases; however, this code satisfies 5 and 6 for as many cases as is possible; that is, it satisfies 5 for 299 out of 327 cases and satisfies 6 for 6 out of 15 cases. Thus while the code is incapable of correcting all possible double-bit errors, it is possible to correct for approximately 70% of double-bit differential errors.

Therefore it is an object of the present invention to provide error correction for DQPSK data.

It is a further object of the present invention to provide means for correcting all single-bit and most double-bit errors in DQPSK data.

Other objects of the invention are to provide error correction for DQPSK with the minimum amount of redundancy and error correcting apparatus.

THE DRAWINGS

These and other objects, features and advantages of the present invention will be apparent from the more particular description of the preferred embodiment of the invention of which:

FIG. 1 shows a DQPSK system incorporating the present invention;

FIG. 2 shows an encoder used to generate the parity bits in the system of FIG. 1.

FIG. 3 shows the apparatus for calculating the syndromes in the system of FIG. 1; and, FIG. 4 shows the decoder for generating the corrected information bits in the system of FIG. 1.

DESCRIPTION OF THE DRAWING

In FIG. 4, 3 sets 48, 50 and 52 of 3 shift registers each receive the syndromes and data bits of one set of bits. Each set of shift registers receives one of the 3 information bits, $i_8^{a'}$, $i_8^{b'}$ or $i_8^{c'}$, and both the syndromes $S_8^a$ and $S_8^b$ as shown. The syndrome bits are then summed in modolo 2 adders 54 in accordance with the formulas (4) (5) and (6). The results are then Ex ORed in Exclusive OR circuits 56 with the information bits $i_1^{a'}$, $i_1^{b'}$, and $i_1^{c'}$ to generate the corrected information bits $i_1^a$, $i_1^b$ and $i_1^c$. The outputs of each of the set of shift registers are then fed into an AND gate 58 which also receives a separately timed signal from a ring counter 60 so that the output of the AND gates contain a serial string of the corrected data bits.

Figure 1:
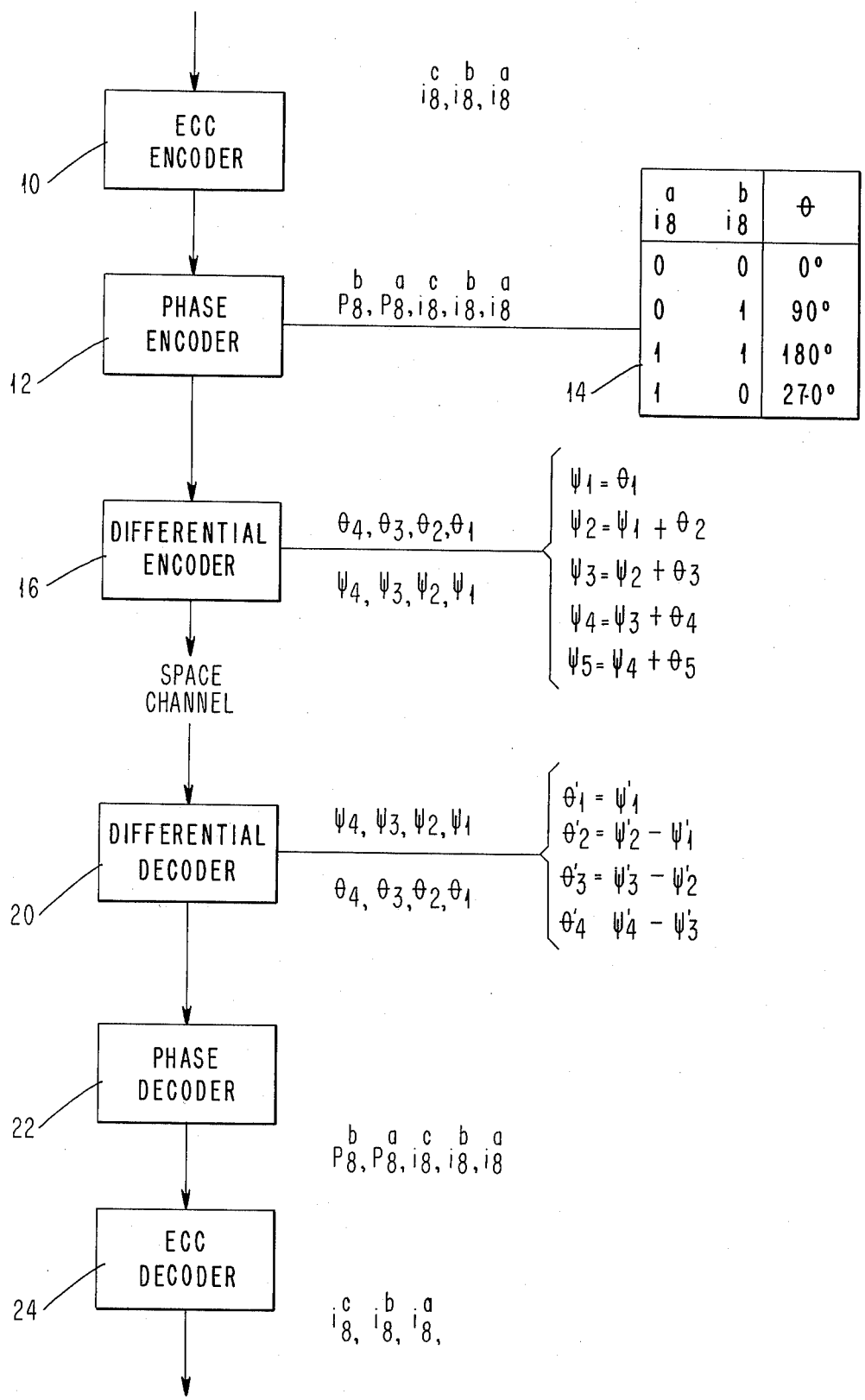
Referring now to FIG. 1, in any 24 bits of data the information bits $i$ are split into sets of 3 bits each. These 3 bit sets are fed into the error correcting decoder 10 where the parity bits are generated in accordance with the equation 1. Parity bits and the information bits are then placed into a phase encoder 12 where each 2 bits in sequence are redefined in terms of a phase change $\theta$ as shown in chart 14. Dependent on the state of each of the bits these phase changes are then used to modulate the phase of the carrier in the differential encoder 16 so that after the first phase change the phase of the carrier will be $\psi_1 = \theta_1$. After the second phase change the carrier phase will be $\psi_2 = \psi_1 + \theta_2$ and so on so that the data is in the form of a shift in the phase of a carrier signal. The carrier signal with its phase encoded data is transmitted to a second station where a differential decoder 20 decodes the changes in carrier phase back to shifts of the phase so that the output, $\theta'$, of the differential decoder after the second phase change will be equal to $\psi_1'$ and after the second phase change will be equal to $\psi_2' - \psi_1$ The phase data is fed into a phase decoder 22 that converts the data back into binary signals including two parity bits, $P_8^a$ and $P_8^b$ and three information bits, $i_8^{a'}$, $i_8^{b'}$ and $i_8^{c'}$ in each set. Using the parity and data bits of the set and some of the bits from the preceding sets, with the assumption that they are correct, the ECC decoder 24 provides the corrected data bits of the $i_8^a$, $i_8^b$ and $i_8c$ present set.
Figure 2:
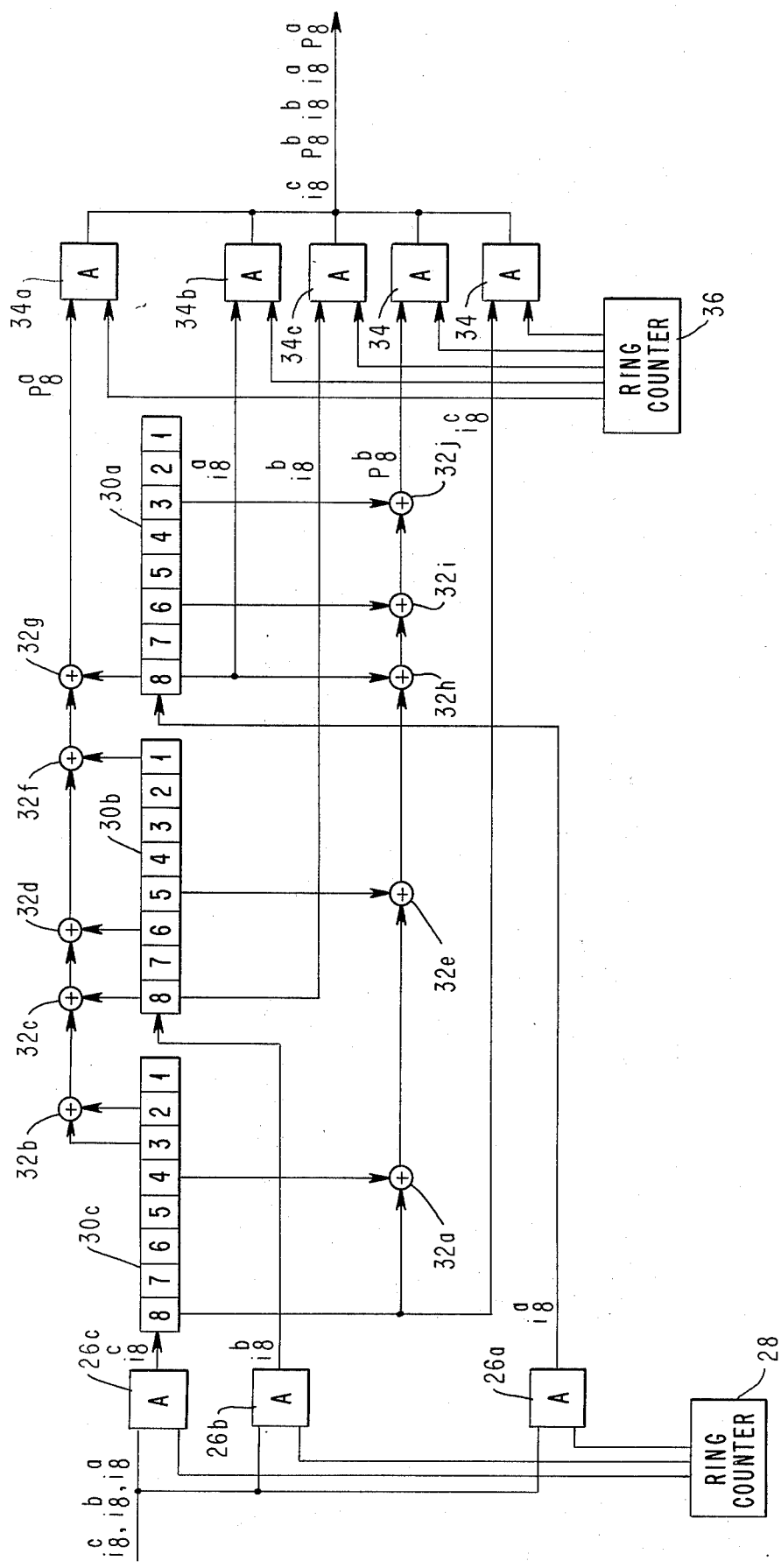
Referring now to FIG. 2, it can be seen how the parity bits are generated. A serial string of data bits is fed into one input of each of three AND gates 26. The other input to the three AND gates 26 is from a separate output of a three position ring counter 28 synchronized with the rate of the data transmission so that each bit of any 3 bit set is gated through a different one of the 3 AND gates. The outputs of each of these AND gates 26 goes to a separate eight position shift register 30 containing information bits from the 7 sets in the sequence. Certain of the bits are then Ex ORed in Ex OR gates 32 in accordance with equations (1) to generate the parity bits for the present set. The bits for the present set and the generated parity bits are then each placed into a separate AND gate 34. The other input to the AND gate 34 is from a ring counter 36 which sends a pulse to activate the gates in sequence to provide a serial string of 2 parity bits and 3 information bits from each set at the common output to the AND gates 34. These 5 bit sets are then fed into the phase encoder 10.
Figure 3:
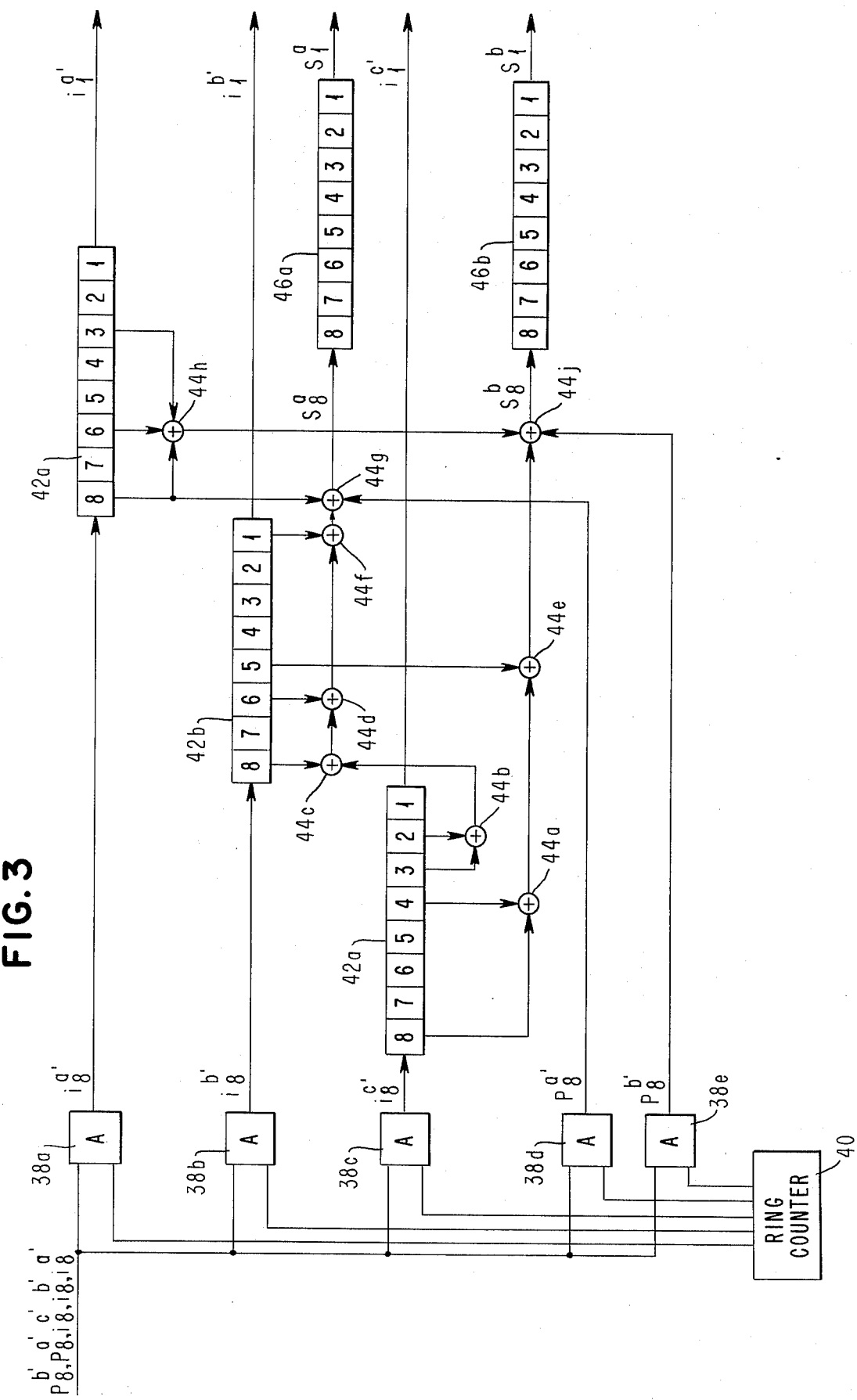
Referring to FIG. 3 it can be seen how the syndrome bits are generated. The serial string of data bits from decoder 22 is fed through the AND gates 38 controlled by ring counter 40 into separate shift registers 42 containing data from the last sets of the sequence. These bits are Ex ORed with each other and with the present set of parity bits in Exclusive OR circuits 44 to generate the syndrome $S_8^a$ and $S_8^b$ in accordance with equations (2). These syndromes are then fed into two additional shift registers 46 and the output of all 5 shift registers is fed in parallel to the error correcting circuitry of FIG. 4.

Therefore while the invention has been particularly shown and described with reference to a preferred embodiment thereof, it will be understood by those skilled in the art that the above and other changes in form and details may be made therein without departing from the spirit and scope of the invention.

What is claimed is:

1. In error correction apparatus for correcting errors in binary information that has been transmitted using apparatus encoding and decoding the data as differentially encoded qradrature phase shift keyed data and using an $(mn_0, mk_0)$ convolutional code with the truncated parity check matrix: ps $$H = (D, TD, T^2D, \ldots, T^{m_1}D)$$

where D is an $(n_0-K_0)m \times n_0$ binary matrix and T is the shift matrix defined by $$T_{ij} = \begin{cases} 1 \text{ if } i-j = n_0-k_0, \\ 0 \text{ otherwise} \end{cases}$$

where $m(i_j)$ is a submatrix of H deleting all rows in which the $i^{th}$ bit is zero, the $i_j$th column of $M(i_j)$ has a weight for and every other column of $M(i_j)$ has weight zero or one, the improvement comprising:

first shift register means, coupled to the input of apparatus for encoding the data as differentially encoded quadrature phase shift keyed data, for dividing a sequence of said data bits into a plurality of sets and generating parity bits for each set of the binary information bits in the sequence in accordance with the submatrix $(Mi_j)$ where the EXclusive OR columns $i$, $i+1$, $i+2$, $i+3$ of $M(i_j)$ has a weight zero or one if $i_j < i$ or $i_j > i+3$, and the EXclusive OR of columns $i$, $i+1$, $i+2$, $i+3$ of $M(i_j)$ has weight three or four if $i_j-i=0, 1, 2$ or 3;

second shift register means, at the output of the apparatus decoding differentially encoded quadrature phase shift keyed data, for dividing a sequence of decoded data bits into a number of sets including the information bits and parity bits of encoded sets, and;

third shift register means, coupled to the output of the second shift register means, for receiving said generated syndromes of the sequence and the data bits of the sequences to correct said data bits.

2. The apparatus of claim 1 wherein the first, second and third shift register means encode and decode in accordance with the submatrix $(Mi_j)$ where the EXclusive OR of most of columns $i$ and $2+K$ of $M(i_j)$ has a weight zero or one if $i \neq i_j$ and $2+K \neq i_j$ for $K=1, 2, 3$ and part of column $i$ of $M(I_j)$ has weight zero for $|i-i_j| \leq 4$.

3. The apparatus of claim 1 wherein:

the first shift register means includes means for splitting up the sequence of 24 information bits into 8 sets of 3 bits each and generating two parity bits for each of the sets in accordance with the equations:

$$P_8{}^a = i_8{}^a + i_8{}^b + i_6{}^b + i_1{}^b + i_3{}^c + i_2{}^c$$
$$P_8{}^b = i_8{}^a + i_6{}^a + i_3{}^a + i_5{}^b + i_8{}^c + i_4{}^c$$

where $i_8{}^a$, $i_8{}^b$ and $i_8{}^c$ are the information bits in the set corrected by the parity bits $P_8{}^a$ and $P_8{}^b$ while the other information bits are from the seven sets in the sequence preceding the set $i_8{}^a$, $i_8{}^b$ and $i_8{}^c$, the second shift register means includes means for generating the syndromes in accordance with the equations:

$$S_8{}^a = P'_8{}^a + i'_8{}^a + i'_6{}^b + i'_6{}^b + i'_1{}^b + i'_3{}^c + i'_2{}^c$$
$$S_8{}^b = P'_8{}^b + i'_8{}^a + i'_6{}^a + i'_3{}^a + i'_5{}^b + i'_8{}^c + i'_4{}^c$$

the third shift register means corrects the bits in error in accordance with the equations:

$$i'_k{}^a = i_k{}^a + e_k{}^a$$
$$i'_k{}^b = i_k{}^b + e_k{}^b$$
$$i'_k{}^c = i_k{}^c + e_k{}^c$$

where $$e_1^a = \begin{cases} 1 \text{ if 3 or 4 of } [S_1^a, S_1^b, S_3^a, S_8^a] \text{ are 1} \\ 0 \text{ if 2, 3, or 4 of } [S_1^a, S_1^b, S_3^a, S_8^a] \text{ are 0} \end{cases}$$

$$e_1^b = \begin{cases} 1 \text{ if 3 or 4 of } [S_1^a, S_3^a, S_6^a, S_2^a] \text{ are 1} \\ 0 \text{ otherwise} \end{cases}$$

$$e_1^c = \begin{cases} 1 \text{ if 3 or 4 of } [S_8^a, S_7^a, S_1^a, S_8^a] \text{ are 1} \\ 0 \text{ otherwise.} \end{cases}$$

* * * * *

UNITED STATES PATENT AND TRADEMARK OFFICE
CERTIFICATE OF CORRECTION

PATENT NO. : 4,035,767
DATED : July 12, 1977
INVENTOR(S) : C. L. Chen, R. A. Rutledge It is certified that error appears in the above-identified patent and that said Letters Patent are hereby corrected as shown below:

Column 1, line 58, the word "The" should read --Two--.

Column 2, line 3, the "," preceding the equation should be omitted.

Column 2, line 26, "$M(_j)$" should read --$M(i_j)$--.

Column 2, line 34, "$Mn_0-3$," should read --$mn_0-3$,--.

Column 2, line 38, "$_j-i=0...$" should read --$i_j-i=0...$--.

Column 2, line 41, "$Mn_0-1$," should read --$mn_0-1$,--.

Column 2, line 42, "$M(_j)$" should read --$M(i_j)$--.

Column 4, line 17, "equal to $\psi_2' -\psi_1$" should read --equal to $\psi_2' -\psi_1$ and so on.--.

Column 4, line 20, "$P_8^b$" should read --$P_8^a$--.

Column 5, line 17 (Claim 1), "ps" should be omitted.

UNITED STATES PATENT AND TRADEMARK OFFICE
CERTIFICATE OF CORRECTION

PATENT NO. : 4,035,767
DATED : July 12, 1977
INVENTOR(S) : C. L. Chen, R. A. Rutledge It is certified that error appears in the above-identified patent and that said Letters Patent are hereby corrected as shown below:

Column 5, line 31 (Claim 1), "for" should read --four--.

Signed and Sealed this

Eleventh Day of October 1977

[SEAL]

Attest:

RUTH C. MASON
Attesting Officer

LUTRELLE F. PARKER
Acting Commissioner of Patents and Trademarks